3,199,985
MILK POWDER AND MANUFACTURING PROCESS
Jean-Jacques Mourey, Lausanne, Vaud, Switzerland, assignor to Afico S.A., Lausanne, Switzerland, a corporation of Switzerland
No Drawing. Filed Nov. 13, 1962, Ser. No. 237,300
Claims priority, application Switzerland, Nov. 15, 1961, 13,238/61
15 Claims. (Cl. 99—56)

The present invention concerns a process for the preparation of a milk powder which is instanly miscible in water.

The "miscibility" of a whole milk powder, for instance, is a spontaneous phenomenon which is characterized by the faculty of the powder particles, either individually or in groups, and in various degrees, to enter into contact with water. Thus, when milk powder is placed on the surface of a certain volume of water, care having been taken to weigh the powder in such a way as to obtain a distribution of the components which is identical to that observed in fresh milk, three different cases may be observed:

(1) The powder remains on the surface of the water; practically no immersion of the particles is observed.

(2) Spontaneous immersion of a part of the particles only, the other part remaining on the surface of the water indefinitely.

(3) Spontaneous immersion of all the milk particles, which fall, more or less rapidly, towards the bottom. After a certain time, no more powder remains on the surface of the liquid.

The first case is an illustration of a powder with poor miscibility. In the second case, several degrees can be distinguished. If only a few particles become immersed, the miscibility is still to be considered poor, whereas from the moment more than a quarter of the quantity of powder becomes immersed, the latter may be qualified as a "non-instant miscible" powder. In the third case, the powder may be considered as having "good instant miscibility," provided however that total immersion occurs within two minutes. If this time is exceeded, the qualification "instant" must be replaced by "non-instant."

If the three phenomena described above are reproducible at the same temperature, and naturally with identical powders, this is not the case if the operation is effected with water of a higher temperature. Under these conditions, the phenomenon of the first case may easily evolve towards that of the second, while the latter phenomenon may tend towards that of the third case. It is assumed, in fact, that a progressive increase in the temperature of the water leads sooner or later to the total immersion of the particles, a situation which is the final term in the mutual behavior of the milk powder/water complex. It is therefore essential, when defining the nature of the miscibility of a milk powder, to indicate the exact temperature of the water used in the operation.

Milk powders are generally manufactured from a homogenized concentrated whole milk. Spray-drying in an appropriate apparatus leads to the production of a powder containing 2 to 3% of residual moisture and in which the fat is apparently distributed homogeneously in the form of enclaves in the milk solids, i.e. the lactose, the mineral salts and the proteins, which represent the greater part in volume and in weight of the product. These enclaves of fat have practically the same chemical composition and, particularly at normal storage temperatures, the greater part of the fat remains solid. The extraction of the fat by means of dry ether, from a powder treated with great care after the spray-drying operation in order to avoid any abrasion of the particles due to friction among each other, gives very insignificant results with regard to the free fat content. On the other hand, it is possible to extract a larger quantity of fat from a powder which has been mechanically crushed, since the ether has easier access to the said component. In this latter case, where poor miscibility is observed at 20, 30 and, frequently, even at 40° C., the greater part of the fatty surface accessible to the water at the moment of the reconstitution of a whole milk, is in a solid phase. Thus, this water-tight film imparts a distinctly hydrophobic character to the whole particle.

The purpose of the invention is to eliminate these disadvantages. Its object is a process for the preparation of a milk powder, remarkable especially in that, after spray-drying of the product, the powder particles are coated at least partially with a substance composed, at least in part, of milk fat fraction which is liquid at low temperature.

It has been observed, in the case of such a powder coated with a small fraction of butter oil which is liquid at normal temperature, for instance 16° C., that the hydrophobic character disappears totally and that a good instant miscibility in water at 20° C. can be obtained.

By "coating" is meant the bringing into contact, by appropriate means, of the powder particles coming out of the drying apparatus, with the oily substance. This term signifies not only the complete coating of each of the particles with butter oil, for instance, but also within wider limits, the bringing into contact of the microglobules of fat with the said particles, of which a more or less large fraction of the surface (including the contact surface between the elemental particles constituting agglomerates) absorbs the fat. The particles have a relatively large capacity for oil absorption; the whole milk reconstituted from a powder of which the particles have been coated to the amount of 2% by weight in proportion to the total finished powder, shows no liberation of the added fat in the form of fat globules, for instance, on the surface of the reconstituted liquid.

The invention also concerns a whole milk powder which is essentially distinguished by the following characteristics:

(a) The particles composing the milk powder presents, on at least part of their surface, a film containing at least the fraction of the milk fat which is liquid at 16–18° C.;

(b) It has good instant miscibility, as defined above, in water at a temperature lying between 20 and 40° C.

The structure of each of the particles of the above mentioned powder is such that the solids non fat of the milk are distributed uniformly on the inside of these particles whereas the milk fat is distributed heterogeneously; the fraction of the said fat which is solid at a temperature of 16° C. is on the inside of the particles while the fraction which is liquid at that temperature is for the most part distributed on the periphery of the particle. It is understood, of course, that in the case of a whole milk powder, the composition of the powder according to the invention is absolutely identical to that of the whole milk originally used. Moreover, what has just been said of a whole milk powder, i.e. a powder with an approximately 28% fat content, is also applicable to other pulverulent products made from milk and having, for instance, a higher or lower fat content than that mentioned above. In such cases, a part of the liquid fraction of the milk fat can be replaced by various other fats which are advantageous from the nutritive or economic point of view, for instance, peanut oil, soya oil, sunflower oil, corn oil, or even other edible glycerides, preferably, of vegetable origin.

It should be added that the said coating of the powder particles can be effected not only with the fraction of butter oil which melts at low temperature, but also with the said oil in emulsion with water or skimmed milk.

Finally, butter oil with a low melting point can also be mixed with one or more of the fats mentioned, or even with a small quantity of lecithin.

The process according to the invention can, for example, be carried out as follows:

Butter oil is generally obtained from cream with an approximately 35% fat content, separated from whole fresh milk by centrifugation. After pasteurization at 80° C., the cream is centrifuged a second time, which makes it possible to obtain a thick cream with an approximately 80% fat content. By homogenizing this cream under high pressure and at a temperature of about 70° C., a liquid butter oil covering a layer of skimmed milk is obtained. After washing with hot water and centrifugation of this oil, a clear product with a low residual moisture content is normally collected. The oil resulting from the operations described above, is conveyed by means of a pump to a heat exchanger fed with ice water, of which the inner walls coming into contact with the product are continuously scraped by rotary blades. When the output of the said pump is correctly adjusted, a semi-solid substance composed of fine fat crystals with a high melting point and surrounded by the liquid fraction of the oil originally used, is collected at a temperature of 16° C. at the outlet of the exchanger. This mixture is stored for a certain time at a temperature of 16° C., then conveyed to a filter on which the separation of the two fractions of the fat takes place, the said separation being effected by pressure or under vacuum. If the fraction of the fat with a low melting point is of satisfactory quality, it must contain no crystals when stored at 16° C., or at a slightly higher temperature.

Concerning the ratio $$\frac{\text{Solid fat fraction}}{\text{Liquid fat fraction}}$$

at a temperature of 16° C., it varies according to the nature of the fresh whole milk used, and the season of the year at which it is produced. The average ratio is approximately 4; in summer it is slightly lower than this figure, whereas in winter it is slightly higher.

The whole milk powder to be coated is fed by a conventional process through a vibrating feeder in a funnel traversing the inlet wall of a cyclone, perpendicularly to the axis of this orifice. On this axis is mounted a pneumatic sprayer fed with compressed gas and intended to produce, at an adjustable and constant output, a stream of aerosol composed of the oil or emulsion to be sprayed. When the various parts of the apparatus are operating simultaneously, the downward movement of the powder, induced by gravity, is first interrupted by the stream of gas, then drawn by this latter in its trajectory towards the interior and bottom of the cyclone. When the two perpendicular currents meet, the liquid fat globules forming the aerosol are easily absorbed by the powder particles, and this, all the more so, because the stream of gas, which is itself the carrier of the aerosol, makes it possible to dissociate practically all of the elements of the powder which are whirling in the gaseous current, and thus facilitates the contact of the particles with the oily microdroplets.

Needless to say, other means than those described above can, in actual practice, be successfully used.

The following examples illustrate the execution of the process according to the invention, which is not however limited to the condition described.

EXAMPLE 1

*Preparation of a whole milk powder according to the invention*

The process starts with a whole milk, standardized in such a way that the final fat content of the dried powder is equal to 28% of the weight of the powder (calculated with a 3% residual moisture content). The entire batch of whole milk to be treated representing 100%, a quantity equal to 35.6% is removed and subsequently submitted to centrifugation in a ratio of 1/10 for example, in order to obtain a cream with a 35% fat content. The whey resulting from this operation is immediately incorporated with the initial fraction (64.4%) of the whole fresh milk which has been set aside.

The 35% cream obtained is submitted to a second centrifugation so as to produce a thick cream containing at least 80% fat. As previously, the whey is incorporated in the fraction of fresh milk which has been set aside. The butter oil is prepared by homogenization and the lower layer consisting of whey is also added to the fresh milk which has been set aside.

The quantity of butter oil obtained, representing 10% of the weight of the final quantity of power, is separated into two fractions of which one, crystallized at 16° C., represents approximately 8% of the total weight of the powder finally obtained, whereas the other fraction, equal to about 2% of this weight, is composed of the fat which is in a liquid state at the aforesaid temperature. This latter fraction constitutes the raw material used in the operation of coating the powder particles occurring at the end of the process.

The quantity of fresh milk set aside and kept at a temperature of about 4° C., as well as the aforesaid crystalline fraction of the fat stored, after melting, at a temperature of 50° C., are pasteurized simultaneously in a continuous manner at a temperature of 90° C. and for a period of 2 to 5 seconds. The milk is then concentrated under vacuum at low temperature, for instance 45° C., until a product with a solids content of about 40% by weight in proportion to the mass coming from the apparatus, is obtained. After heating to about 60° C., the product is submitted to double homogenization, the pressures being chosen as a function of the nature of the milk in order not to increase, beyond certain limits, the viscosity of the liquid concentrated product resulting from the treatment. This product is then spray-dried by a continuous method in the drying apparatus; the heat supply is adjusted in such a way that the average temperature of the air on the inside of the apparatus does not exceed 70° C., and that the residual moisture content of the powder does not exceed 5.5 to 6%. Finally, the pulverulent product is carefully conveyed to the cyclone described above in order to accomplish the coating of the powder particles by means of the fraction of milk fat which is liquid at 16° C., this fraction representing 2% by weight of the finished product.

With the purpose of imparting to the product a residual moisture content equal or inferior to 3%, the coated powder is dried on a shaker sieve by a hot air current having, preferably, a temperature of about 100° C.

In a variant of the process, the last drying could occur before the coating operation.

The dry powder, having a moisture content equal or inferior to 3%, is finally cooled on a second shaker sieve by a dry air current, then packed in suitable containers.

The whole milk powder obtained has good instant miscibility as defined above, in water at 25° C.; it retains this characteristic after prolonged storage during which no significant organoleptic transformation can be detected.

EXAMPLE 2

*Improvement of a standard milk powder*

The raw material is a milk powder with a 25% fat content manufactured from whole milk by a conventional process comprising for example, the following operations:

HTST pasteurization, i.e. at a high temperature and for a short time; concentration to a solids content of 26%; sufficient homogenization to reduce the size of the fat globules to an average of 1 to 2$\mu$; spray-drying at a temperature adjusted so as to obtain, when manufacturing on an industrial scale, a powder with a moisture content lying between 2 and 2.5%.

Such a product has satisfactory solubility but does not have good instant miscibility (according to the definition give above) in water at 40° C. This quality can be imparted to the said powder by submitting it to the coating operation described above on the basis of a total addition, equal to 2% by weight of the entire quantity of finished product, of a homogeneous mixture comprising, for example:

9 parts of the fraction of milk fat which is liquid at 16° C.;
1 part of soya lecithin.

The coated powder resulting from the process described above corresponds to the physical definition which it is desired to attain, in spite of its superficial "oily" appearance and its high specific gravity; no organoleptic modification is observed during a normal storage period.

I claim:

1. A method for the manufacture of a milk powder containing fat and having a good instant miscibility in water at a temperature lying between 20 and 40° C., which comprises the steps of pasteurizing a member of the group consisting of whole milk and partially skimmed milk, concentrating, homogenizing, spray-drying and, after this latter operation, coating at least in part substantially all of the powder particles with a substance comprising at least the milk fat fraction which is liquid at 16–18° C.

2. A method for the manufacture of a milk powder containing fat and having a good instant miscibility in water at a temperature lying between 20 and 40° C., which comprises the steps of separating the fat from at least part of a batch of whole milk, dividing the said fat into two fractions by crystallization at 16–18 C. in order to extract the fraction which is in a liquid phase at this temperature, adding the solid fraction of the said fat to the starting batch, pasteurizing, concentrating and spray-drying said batch and, following this last operation, spraying a substance composed, at least in part, of the said fat fraction liquid at 16–18° C. on substantially all of the powder particles resulting of the said spray-drying.

3. A method as claimed in claim 1 in which the said powder particles are coated with a substance composed of a mixture comprising the said liquid fraction of the milk fate and a glyceride of vegetable origin which is liquid at room temperature.

4. A method as claimed in claim 1 in which the said powder particles are coated with a substance composed of an emulsion comprising the said liquid fraction of the milk fat and water.

5. A method as claimed in claim 1 in which the said powder particles are coated with a substance composed of an emulsion comprising the said liquid fraction of the milk fat and skimmed milk.

6. A method as claimed in claim 1 in which the said powder particles are coated with a substance composed of a mixture comprising the said liquid fraction of the milk fat and lecithin.

7. A method for the manufacture of a milk powder containing fat and having a good instant miscibility in water at a temperature lying between 20 and 40° C., which comprises the steps of pasteurizing a member of the group consisting of whole milk and partially skimmed milk, concentrating, homogenizing, spray-drying and, after this latter operation, coating at least in part substantially all of the powder particles with a substance representing about 2% by weight of the total quantity of the powder and comprising at least the milk fat fraction which is liquid at 16–18° C.

8. A method for the manufacture of a milk powder containing fat and having a good instant miscibility in water at a temperature lying between 20 and 40° C., which comprises spraying a substance composed, at least in part, of the fraction of the milk fat which is liquid at 16–18° C. on substantially all of the particles of a standard whole milk powder.

9. A method for the manufacture of a milk powder containing fat and having a good instant miscibility in water at a temperature lying between 20 and 40° C., with comprises spraying a substance composed, at least in part, of the fraction of the milk fat which is liquid at 16–18° C. on substantially all of the particles of a standard whole milk powder, said substance representing about 2% by weight of the total quantity of the said powder.

10. A milk powder having a good instant miscibility in water at a temperature lying between 20 and 40° C. and consisting of particles of dried whole milk, substantially all of said particles being at least partially coated on their surfaces with a film, said film comprising a milk fat component consisting essentially of milk fats having a melting point of from 16° to 18° C.

11. A milk powder as claimed in claim 10, wherein the film consists essentially of a milk fat fraction having a melting point of from 16° C. to 18° C. and a glyceride of vegetable origin which is liquid at room temperature.

12. A milk powder as claimed in claim 10, in which the film consists essentially of a milk fat fraction having a melting point of from about 16° C. to 18° C. and lecithin.

13. The milk powder of claim 10, wherein said powder contains about 2% by weight of said fat film, based on the total quantity of milk powder.

14. A milk powder having good instant miscibility in water and a temperature lying between 20° C. and 40° C. and consisting of particles of dried whole milk having a fat content ranging from 25 to 28% by weight, substantially all of said particles being at least partially coated on their surfaces with a film, said film comprising a milk fat component consisting essentially of milk fats which have a melting point of from 16° C. to 18° C.

15. The milk powder of claim 14, said milk powder containing about 2% by weight of said milk fat component, based on the total weight of said powder.

References Cited by the Examiner

UNITED STATES PATENTS

| | | | |
|---|---|---|---|
| 2,399,565 | 4/46 | North et al. | 99—56 |
| 2,911,301 | 11/59 | Winder et al. | 99—56 |
| 2,966,409 | 12/60 | Williams et al. | 99—56 |
| 3,080,235 | 3/63 | Hodson et al. | 99—56 |

A. LOUIS MONACELL, *Primary Examiner.*